(12) United States Patent
Song et al.

(10) Patent No.: US 6,568,871 B2
(45) Date of Patent: May 27, 2003

(54) SPHERICAL JOINT FOR COUPLING THREE OR MORE LINKS TOGETHER AT ONE POINT

(75) Inventors: Se-Kyong Song, Seoul (KR); Dong-Soo Kwon, Taejon (KR); Wan Soo Kim, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 09/729,238

(22) Filed: Dec. 5, 2000

(65) Prior Publication Data

US 2001/0002964 A1 Jun. 7, 2001

(30) Foreign Application Priority Data

Dec. 6, 1999 (KR) .......................................... 1999-55255

(51) Int. Cl.$^7$ .......................... F16C 11/00; F16C 11/06
(52) U.S. Cl. ................... 403/170; 403/169; 403/76; 403/131; 403/141; 403/135; 403/74
(58) Field of Search ................... 403/170, 169, 403/135, 140, 217, 64, 74, 91, 79; 248/481, 484; 359/846, 872, 896; 74/473.34; 108/1, 4

(56) References Cited

U.S. PATENT DOCUMENTS

| | | | | |
|---|---|---|---|---|
| 241,846 A | * | 5/1881 | Edsall ........................... 403/74 |
| 1,946,408 A | * | 2/1934 | Loudy ........................... 403/64 |
| 4,480,418 A | * | 11/1984 | Ventrella ................. 403/176 X |
| 4,804,220 A | * | 2/1989 | Rosheim .................... 403/74 X |
| 5,310,273 A | * | 5/1994 | Hara ....................... 403/170 X |
| 5,461,515 A | * | 10/1995 | Sorce ...................... 403/171 X |
| 6,382,865 B1 | * | 5/2002 | Paxman ....................... 403/131 |

FOREIGN PATENT DOCUMENTS

CA 1259467 A * 9/1989 ................. 403/170

* cited by examiner

Primary Examiner—Lynne H. Browne
Assistant Examiner—Ernesto Garcia
(74) Attorney, Agent, or Firm—Bacon & Thomas, PLLC

(57) ABSTRACT

A spherical joint for coupling three or more links together at one point. The joint includes a bail and a hollow spherical body wrapping the ball therein. The ball is movable in the hollow spherical body. An upper link inserted into and fixed to the hollow spherical body through an upper link insertion opening formed on the hollow spherical body. Lower links are connected to the hollow spherical body through lower link insertion openings, wherein the number of the lower links correspond to that of the hollow spherical body. Link support discs are set within a gap between outer surface of the central ball and inner surface of the hollow spherical body and fixed to each end of the lower link, and all the axes of the lower links and the upper link are coincident with a center point of the ball.

9 Claims, 6 Drawing Sheets

SPHERICAL JOINT FOR COUPLING THREE OR MORE LINKS TOGETHER AT ONE POINT

BACKGROUND OF THE INVENTION

1. Field of the Invention

The present invention relates to spherical joints and, more particularly, to a spherical joint for coupling three or more links together at one point while allowing the links to be freely movable relative to each other within a predetermined range of motion without allowing any interference between them.

2. Description of the Prior Art

In accordance with the recent trend of increased demand and increased importance of production and machining of high precision parts, production of semiconductors, microsurgery, gene manipulation and cell conformity in a variety of industrial fields, such as a high precision engineering field, a semiconductor manufacturing field, a medical field and a genetic engineering field, the study and development of robots or manipulators for micro-positioning work has been actively carried out.

In the prior art, a variety of serial robots with open links have been used as such manipulators for micro-positioning work in a variety of industrial fields. Due to their open links, such serial robots are somewhat advantageous in that they preferably provide a large workspace, and preferably accomplish improved manipulability. However, these serial robots are problematic in that they inevitably create accumulated errors at their end effectors since they have serial actuators. The serial robots are thus undesirably deteriorated in their operational accuracies. Another problem experienced in the conventional serial robots resides in that their operational performance is undesirably reduced, particularly when they are used in high-speed work or other work with excessively variable weight of dynamic load.

In an effort to overcome such problems experienced in the conventional serial robots, a variety of parallel mechanisms have been actively studied since the 1980s. Such parallel mechanisms have a closed chain structure, and so they are free from actuator-caused errors accumulated at their end effectors in addition to preferably having a high structural strength different from the conventional serial robots, even though the workspace provided by the parallel mechanisms is regrettably smaller than that of the serial robots. The parallel mechanisms thus accomplish a desirably high operational performance when they are used in high-speed work or other work with excessively variable weight of dynamic load. Therefore, it is more preferable to use such parallel mechanisms in place of the conventional serial mechanisms for micro-positioning work.

Such parallel mechanisms are structurally advantageous in a variety of items as described above, and so the parallel mechanisms, particularly, six-degrees-of-freedom parallel mechanisms (for ease of description, referred to simply as "6dof parallel mechanisms" herein below) have been preferably and widely used in micro-positioning systems, simulation game systems and a variety of simulators of airplanes and automobiles.

Such a 6dof parallel mechanism is operated by six linearly actuated links, which couple a moving platform to a base platform of the mechanism. In such a 6dof parallel mechanism, the linearly actuated links are coupled to the moving and base platforms using universal joints or ball and socket joints. In order to maximize the potential fields of application and operational performances of such 6dof parallel mechanisms, two or more jointing points are required to be provided at each joints of a moving platform. In addition, it is necessary to design the structure of such joints individually having two or more jointing points such that the joints are not likely to cause interference or limitations to the motion of the linearly actuated links of the parallel mechanisms.

However, a variety of conventionally proposed and used parallel mechanisms having multiaxial joints are problematic in that the design focus of the mechanisms is undesirably limited to the kinetic analysis and the kinetic design of the link mechanisms while disregarding the multiaxial joints, since it is very difficult to optimally design such joints.

As described above, most conventional parallel mechanisms have two or more jointing points at each joint of a moving platform. However, the conventional ball and socket joints or universal joints, typically used as the multiaxial joints of such parallel mechanisms, are designed to couple only two links together, and so the conventional ball and socket joints or universal joints cannot be used for coupling three or more links together at one point. In a multiaxial joint used for coupling two or more links together, the operational performance of the joint directly determines both the size of jointed parts of links and the desired smoothness of motion of the links.

FIG. 1 is a perspective view of a parallel mechanism, with a conventional multiaxial joint having a plurality of stacked pin joints used for coupling six links together. FIGS. 2a and 2b are a perspective view and a partially enlarged view, showing a tetrahedral truss structure with four conventional multiaxial joints coupling three links together at each corner of the tetrahedral truss structure.

As shown in FIG. 1. Kourosh E. Zanganeh, Jorge Angeles, in 1994, proposed a parallel mechanism, of which the moving and base platforms are coupled together by nine links, with six of the nine links being coupled together by one multiaxial joint having a plurality of stacked pin joints (Kourosh E. Zanganeh, Jorge Angeles, "Mobility and Position Analysis of a Novel Redundant Parallel Manipulator", IEEE, IROS, pp. 3043~3084, 1994).

However, the above-mentioned multiaxial joint with the stacked pin joints has a stacked structure including six pin joints and two ball and socket joints, and so the multiaxial joint undesirably has a large size and a complex construction such that it is very difficult to fabricate the desired joint. In addition, this multiaxial joint is ill-affected by backlash caused by the excessive number of parts. Therefore, the multiaxial joint with such stacked pin joints inevitably causes interference between the links and limitations in the motion of the links due to its large structure.

As shown in FIGS. 2a and 2b, Gregory J. Hamlin and A. C. Sanderson, in 1994, proposed a concentric multilink spherical joint used for coupling a plurality of links together to fabricate a parallel mechanism having a tetrahedral truss structure (Gregory J. Hamlin, A. C. Sanderson, "A Novel Concentric Multilink Spherical Joint with Parallel Robotics Applications", IEEE, IROS, pp. 1267~1272, 1994). As shown in the drawings, this concentric multilink spherical joint has a tri-axial joint structure fabricated with quadric crank links assembled into a plate hinge-type linkage, and is used for coupling three links together at each corner of a desired tetrahedral truss structure.

However, the concentric multilink spherical joint necessarily has six quadric crank links in addition to a plurality of hinge parts for fabricating the six quadric crank links into a desired tri-axial joint structure, and so it is very difficult to produce such a concentric multilink spherical joint. Another problem experienced in the concentric multilink spherical joint resides in that it has a large structure due to the excessive number of quadric crank links and hinge parts, and so the practical fabrication of such a joint is always made difficult.

In order to produce a multiaxial joint having a desired jointing function, it is necessary to design the joint to allow the axes of jointed links to precisely converge at one point, thus accomplishing a precise point contact of the links at the joint. However, the conventional multiaxial joints fail to perform such a desired jointing function, and do not have desired practical utility due to their large and complex structure, in addition to difficulty in fabrication of them.

SUMMARY OF THE INVENTION

Accordingly, the present invention has been made keeping in mind the above problems occurring in the prior art, and an object of the present invention is to provide a spherical joint, which is designed to precisely couple three or more links together at one point while allowing the links to be freely movable relative to each other within a predetermined range of motion without allowing any interference between them.

In order to accomplish the above object, the present invention provides a spherical joint for coupling three or more links together at one point, comprising: a central ball; a hollow spherical body movably covering the central ball without allowing a removal of the ball from the spherical body, with a plurality of upper and lower link insertion openings formed at the upper and lower portions of the spherical body; an upper link inserted into the hollow spherical body through the upper link insertion opening and coupled to the top surface of the central ball; a plurality of link support discs set within the gap between the central ball and the hollow spherical body such that the link support discs are not removable from the spherical body through the lower link insertion openings; and a plurality of lower links inserted into the hollow spherical body through the lower link insertion openings and mounted to the link support discs.

In the spherical joint of this invention, the lower link insertion openings are formed on the hollow spherical body at three positions regularly spaced at angular intervals of 120°, thus allowing the axes of the lower links mounted to the link support discs to precisely converge at the center of the central ball.

In addition, the hollow spherical body comprises two hollow hemispherical bodies integrated into a desired single spherical body by a locking means, such as locking bolts.

In a brief description, the present invention provides a multiaxial spherical joint, which is used for coupling three or more links together at one point, and comprises a central ball and a hollow spherical body covering a central ball, with one upper link coupled to the central ball and three or more lower links mounted to the link support discs set within the gap between the central ball and the hollow spherical body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
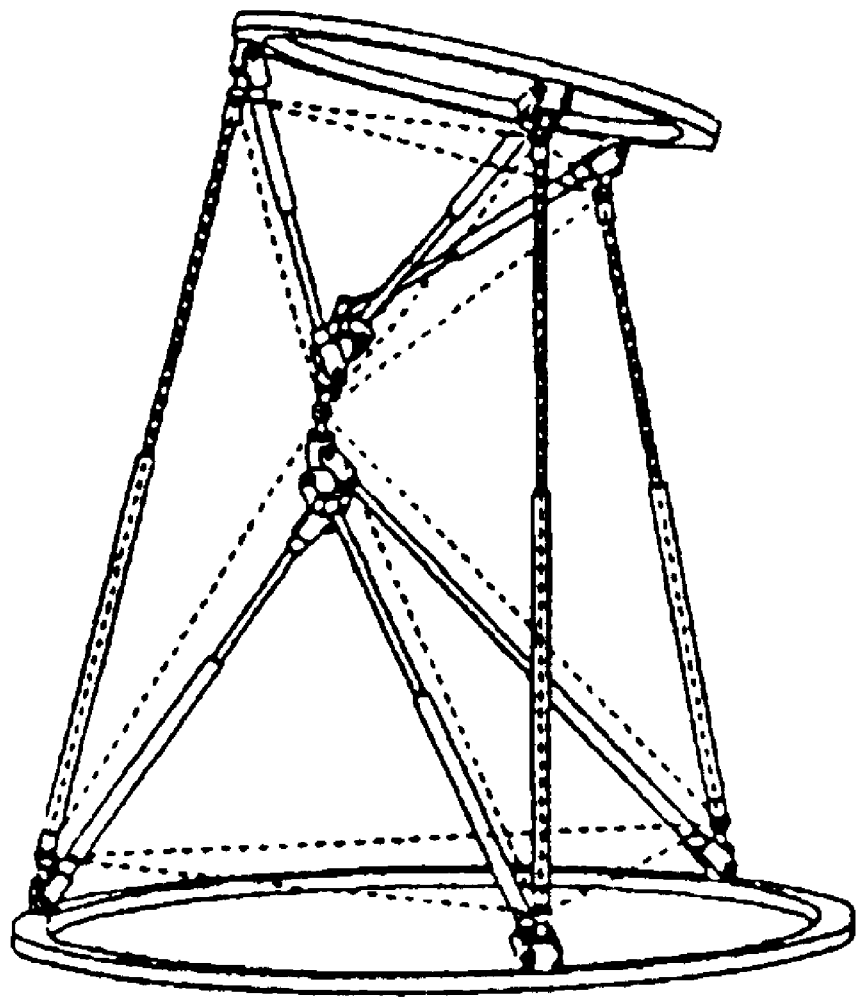
FIG. 1 is a perspective view of a parallel mechanism, with a conventional multiaxial joint having a plurality of stacked pin joints used for coupling six links together.
Figure 2A:
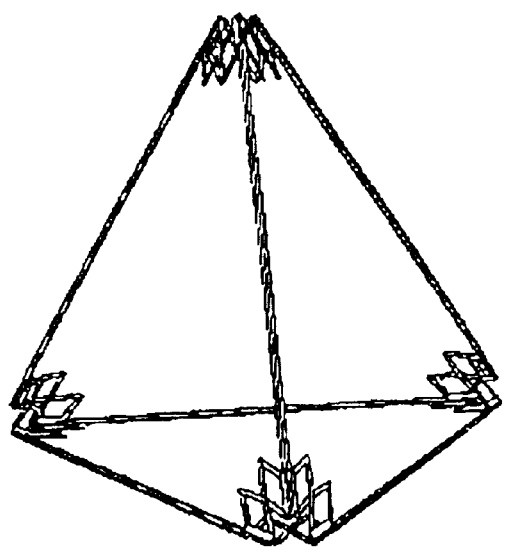
FIGS. 2a and 2b are a perspective view and a partially enlarged view, showing a tetrahedral truss structure with four conventional multiaxial joints coupling three links together at each corner of the tetrahedral truss structure.
Figure 2B:
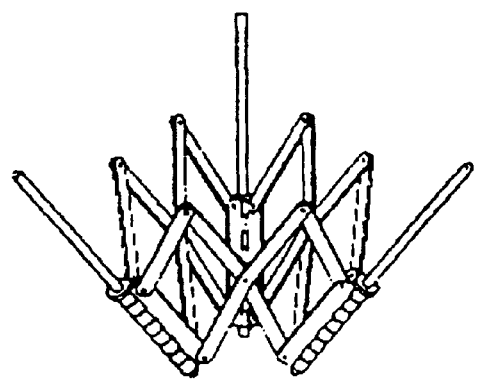

Reference now should be made to the drawings, in which the same reference numerals are used throughout the different drawings to designate the same or similar components.

Figure 3:
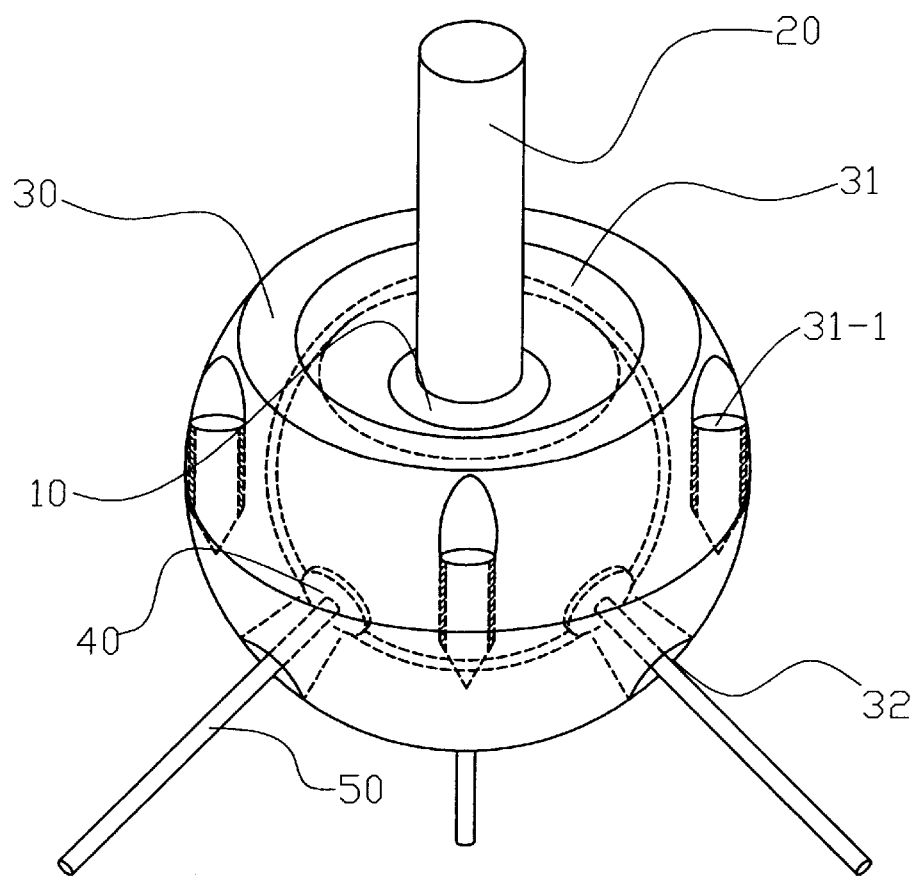
FIG. 3 is a perspective view of a multiaxial spherical joint used for coupling three or more links together at one point in accordance with the preferred embodiment of the present invention.
Figure 4A:
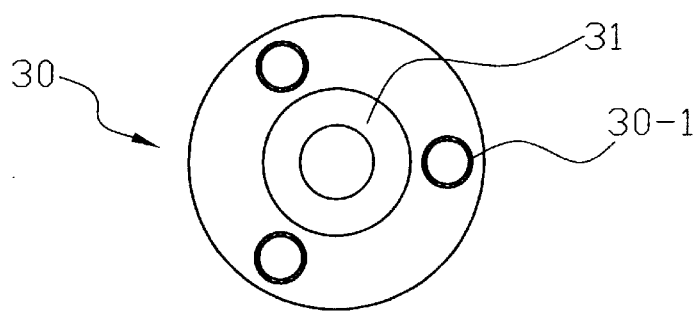
FIGS. 4a and 4b are a plan view and a sectional view of a hollow spherical body included in the spherical joint of FIG. 3.
Figure 4B:
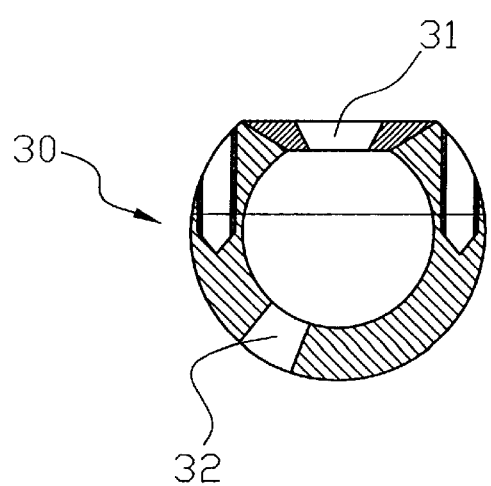
Figure 5A:
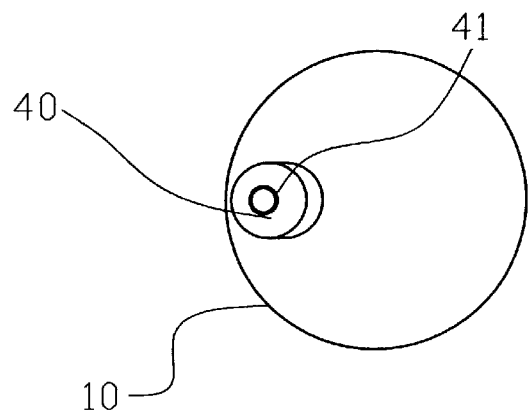
FIG. 5 is a plan view of a link support disc set within the spherical joint of FIG. 3.
Figure 5B:
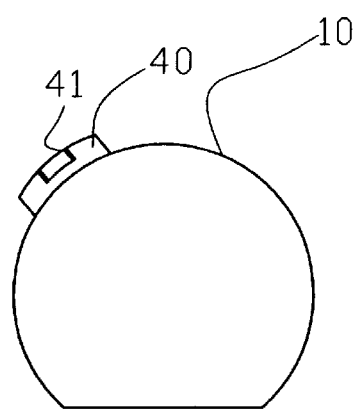
Figure 6A:
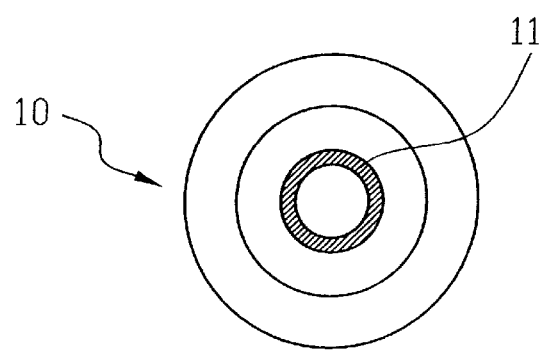
FIGS. 6a and 6b are a plan view and a sectional view of a central ball included in the spherical joint of FIG. 3.
Figure 6B:
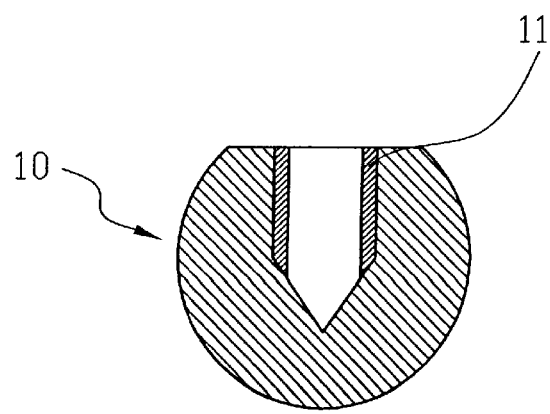

FIG. 3 is a perspective view of a multiaxial spherical joint used for coupling three or more links together at one point in accordance with the preferred embodiment of the present invention. FIGS. 4a and 4b are a plan view and a sectional view of a hollow spherical body included in this spherical joint. FIG. 5 is a plan view of a link support disc set within this spherical joint. FIGS. 6a and 6b are a plan view and a sectional view of a central ball included in this spherical joint.

As shown in FIG. 3, the multiaxial spherical joint used for coupling three or more links together at one point comprises a central ball 10, an upper link 20 coupled to the top surface of the ball 10, and a hollow spherical body 30 movably covering the ball 10 without allowing a removal of the ball 10 from the spherical body 30. This spherical body 30 has a plurality of upper and lower link insertion openings at its upper and lower portions. In addition, a plurality of link support discs 40 are set within the joint and are used for coupling a plurality of lower links 50 to the joint while preventing the lower links 50 from being undesirably removed from the joint. Of course, the discs 40 are set within the joint such that they are not unexpectedly removable from the hollow spherical body 30.

As shown in FIGS. 3, 4a and 4b, an upper link insertion opening 31 is formed at the top surface of the hollow spherical body 30, and allows the upper link 20 to be inserted into the body 30. In such a case, the diameter of the upper link insertion opening 31 is smaller than that of the central ball 10, and so the ball 10 is not unexpectedly removable from the body 30. The above upper link insertion opening 31 is designed in consideration of a range of motion of the upper link 20 within the joint such that the upper link 20 is freely movable relative to the spherical body 30 within the opening 31.

Three lower link insertion openings 32 are formed on the hollow spherical body 30 at three positions regularly spaced at angular intervals of 120°. The diameter of each of the lower link insertion openings 32 is smaller than that of the central ball 10, and so the ball 10 is not unexpectedly removable from the body 30. The above lower link insertion openings 32 are designed in consideration of a range of motion of each of the lower links 50 within the joint such that the lower links 50 are smoothly movable relative to the spherical body 30 within the openings 32.

The hollow spherical body 30 comprises two hollow hemispherical bodies, that is, upper and lower hemispherical bodies integrated into a desired single spherical body 30 by a locking means, such as locking bolts. Since the hollow spherical body 30 comprises the two hollow hemispherical bodies as described above, it is easy to set the central ball 10 within the hollow spherical body 30.

As shown in FIGS. 3 and 5, the support discs 40 are set in the gap between the central ball 10 and the hollow spherical body 30. Such support discs 40 have a diameter larger than that of each lower link insertion opening 32, and so the discs 40 are not unexpectedly removable from the spherical body 30. Formed at the center of each of the support discs 40 are threads 41, into which an associated lower link 50 is screwed.

As shown in FIGS. 3, 6a and 6b, the central ball 10 is cut off at its top portion with a plane parallel to the base, thus having a top plane. An internally-threaded hole 11 is formed at the center of the top plane of the ball 10, thus allowing the upper link 20 to be screwed to the ball 10 at the internally-threaded hole 11.

The above-mentioned parts of the multiaxial spherical joint will be assembled into a single body as follows:

As shown in FIGS. 3 to 6b, the central ball 10 and the three support discs 40 are set within the two hemispherical bodies of the hollow spherical body 30 at predetermined positions. Thereafter, the two hemispherical bodies are integrated into a desired hollow spherical body 30 using a locking means, such as a plurality of locking bolts. After the integration of the two hemispherical bodies into a single body, the upper link 20 is screwed to the internally-threaded hole 11 of the central ball 10, while the three lower links 50 are screwed to the threads 41 of the three support discs 40. Therefore, a desired multiaxial spherical joint, which has a desired jointing function with the axes of the jointed upper and lower links 20 and 50 precisely converging at the center of the central ball 10, is produced.

As described above, the present invention provides a multiaxial spherical joint, which is designed to precisely couple three or more links together at one point while allowing the links to be freely movable relative to each other within a predetermined range of motion without allowing any interference between them.

The spherical joint of this invention is preferably reduced in the number of its parts, and so the joint is easily and simply produced and fabricated. This spherical joint also accomplishes the recent trend of compactness of joints, and accomplishes a desired optimal jointing function, and is remarkably simplified in its construction.

Different from conventional ball and socket joints or conventional universal joints designed to couple only two links together, the multiaxial spherical joint of this invention preferably and effectively couples two, three, four or more links together at one point.

In addition, it is possible to somewhat freely increase the number of links jointed together at this joint when the same number of link insertion openings are formed on the hollow spherical body of the joint.

Another advantage of the multiaxial spherical joint of this invention resides in that this joint is freely usable for a variety of applications requiring such multiaxial joints since this joint can be usable as a joint, requiring three or more links to be coupled together at one point, by changing the number and position of the link insertion openings of the hollow spherical body.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A spherical joint for coupling three or more links together at one point, comprising:
   a ball with a threaded hole at a relatively cut top surface thereof;
   a hollow spherical body including an upper link insertion opening relatively at an upper portion thereof and a plurality of lower link insertion openings relatively at a lower portion thereof, said hollow spherical body housing said ball therein such that a gap is formed between outer surface of said ball and inner surface of said hollow spherical body, said ball is movable in the hollow spherical body;
   an upper link is inserted into and fixed to the ball through said upper link insertion opening, the upper link is screwed to the threaded hole on the cut top surface of the ball;
   a plurality of link support discs set within the gap formed between the outer surface of said ball and the inner surface of said hollow spherical body;
   a plurality of lower links, each of which is connected to a respective one of said link support discs through a corresponding one of the lower link insertion openings, wherein the number of the lower links corresponds to that of the lower link insertion openings; and
   wherein axes of said lower links and said upper link are coincident at the center of the ball.

2. A spherical joint for coupling three or more links together at one point, comprising:
   a central ball;
   a hollow spherical body movably covering said central ball without allowing a removal of the central ball from the hollow spherical body, with an upper link insertion opening and a plurality of lower link insertion openings formed at respective upper and lower portions of said hollow spherical body;
   an upper link, said upper link is inserted into the hollow spherical body through the upper link insertion opening and coupled to a top surface of said central ball;
   a plurality of link support discs set within a gap between said central ball and said hollow spherical body such that the link support discs are not removable from said hollow spherical body through the lower link insertion openings; and
   a plurality of lower links mounted to said link support discs through the lower link insertion openings, wherein said lower link insertion openings are formed on said hollow spherical body at three positions regularly spaced at angular intervals of 120°, and axes of said lower links mounted to said link support discs are precisely converged at a center of said central ball.

3. The spherical joint according to claim 1 or 2, wherein said hollow spherical body comprises two hollow hemispherical bodies, wherein the hollow hemispherical bodies are integrated into a body by a locking means.

4. The spherical joint according to claim 3, wherein said locking means comprises bolts.

5. the spherical joint according to claim 1, wherein said hollow spherical body comprises two hollow hemispherical bodies, wherein said hollow hemispherical bodies are integrated in order to form said hollow spherical body by a locking means.

6. The spherical joint according to claim 5, wherein said locking means comprises bolts.

7. the spherical joint according to claim 1, wherein each of said link support discs comprise a threaded opening adapted for receiving a single end of each of said lower links.

8. The spherical joint according to claim 1, wherein said upper link insertion opening of said hollow spherical body comprises a plane.

9. The spherical joint according to claim 1, wherein said lower link insertion openings are formed on said hollow spherical body at three positions regularly spaced at angular intervals of 120° in order to allow respective axes of said lower links to be mounted to respective ones of said link support discs to precisely converge at the center of said ball.

* * * * *